June 21, 1938.    G. T. COOKE    2,121,425
COTTER PIN
Filed Sept. 27, 1937    2 Sheets-Sheet 1
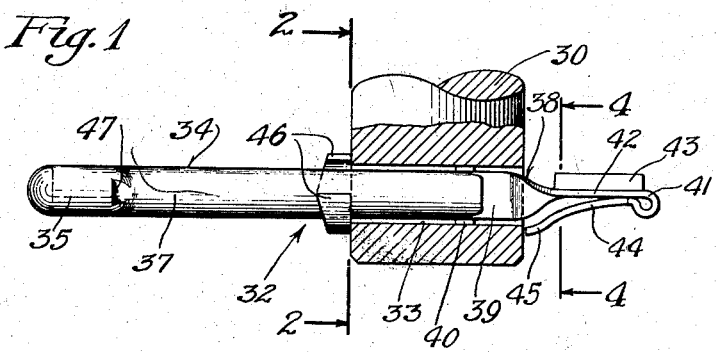
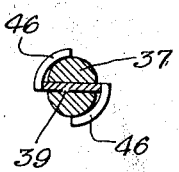
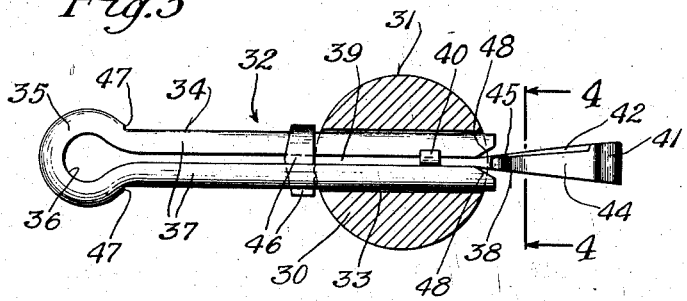
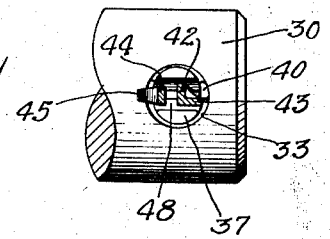
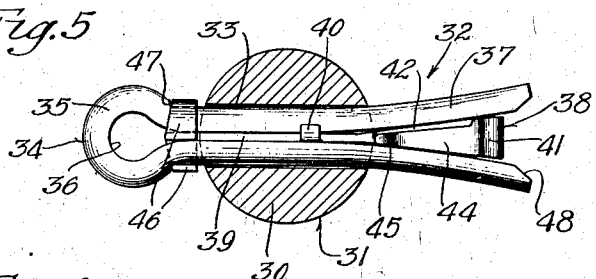
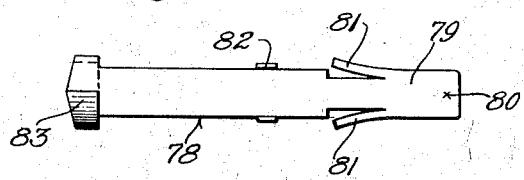
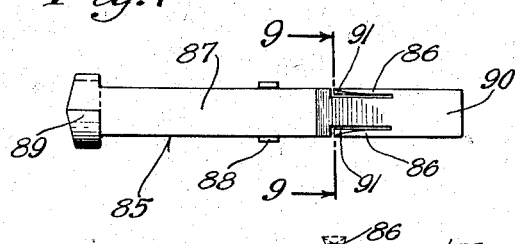
INVENTOR
George T. Cooke
BY William F. Feyrer
ATTORNEY June 21, 1938.　　　　　G. T. COOKE　　　　　2,121,425
COTTER PIN
Filed Sept. 27, 1937　　　　2 Sheets-Sheet 2
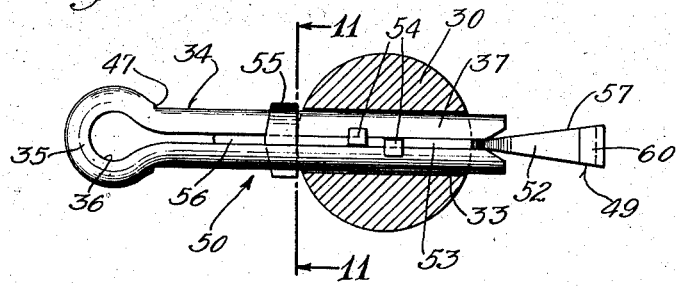
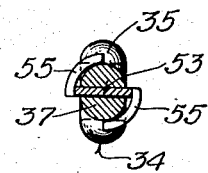
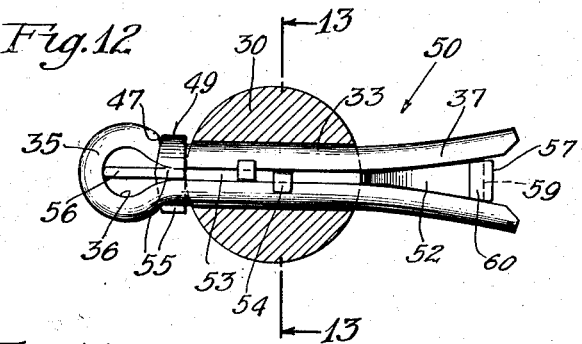
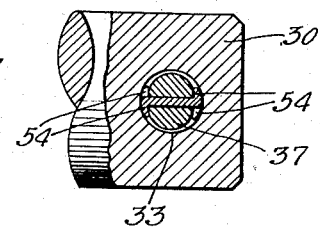
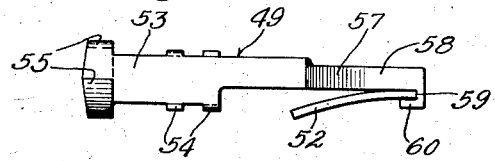
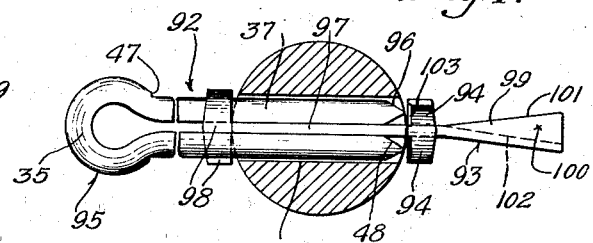
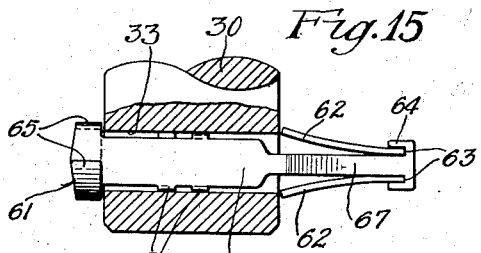
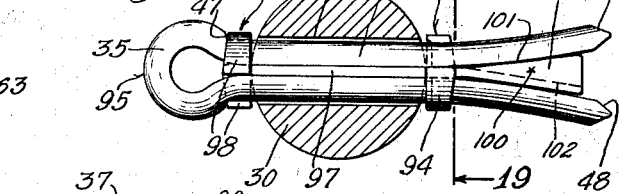
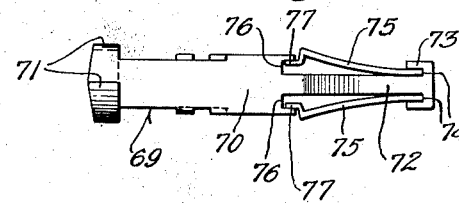
INVENTOR
George T. Cooke
BY William T. Teyrer
ATTORNEY Patented June 21, 1938

2,121,425

UNITED STATES PATENT OFFICE 2,121,425

COTTER PIN

George T. Cooke, Norwalk, Conn., assignor to American Railway Products Co., Inc., Darien, Conn., a corporation of New York Application September 27, 1937, Serial No. 165,840

20 Claims. (Cl. 85—8.5)

This invention relates to cotter pins and particularly to an improved cotter pin retainer.

It is an object of the invention to provide an improved cotter pin structure whereby the cotter pin is automatically spread to be locked in place by an associated retainer member.

A structure of this general nature is disclosed in Patent No. 1,230,876 issued to Carl F. Doerschuk. Devices constructed in accordance with the teachings of that patent have proved to be very satisfactory. Two chief disadvantages, however, are inherent in that structure. One of these is the absence of any means for positively locking the retainer member relative to the body in which the cotter pin is inserted. In the absence of such a means there is the ever present danger of both the retainer member and the cotter pin falling out of the hole should the cotter pin work free of the spreading head. Another disadvantage is the congestion of the looped opening in the cotter pin head by the head engaging portion of the retainer member. Because of this latter fact it is extremely difficult to position the usual cotter pin withdrawing hook in the looped opening in the cotter pin.

Objects of the present invention, therefore, are to a device in which the above two disadvantages are overcome.

A feature of the invention, therefore, resides in providing a cotter pin retainer in which a cotter pin retainer or spreader member is positioned between the arms of the cotter pin and which includes a means for locking the retainer member in the body in which the cotter pin is inserted.

Another feature of the invention resides in providing a cotter pin retainer of the type having a cotter pin retainer or spreader member located between the arms of the cotter pin, in which the cotter pin head engaging means on the retainer member contacts the head free of the looped opening therein.

Another feature of the invention consists in providing a cotter pin retainer in which a resilient means on the cotter pin retainer or spreader member moves outwardly to lock the member relative to the body when the member is inserted therein.

Another feature of the invention resides in providing a finger or fingers on the retainer member which frictionally grip the cotter pin and serve also to arrest movement of the retainer member in a predetermined position when inserted in a body.

Another feature of the invention resides in providing a cotter pin retainer having a cotter pin and a cotter pin retainer member adapted to be inserted in a hole in a body, in which means are provided movable by the cotter pin arms to lock the retainer member relative to the body.

A further feature resides in providing a cotter pin retainer having a cotter pin and a cotter pin retainer member adapted to be inserted in a hole in a body in which a means is provided on the retainer means for frictionally gripping the cotter pin and holding the same in the body should the cotter pin work loose from the spreading section.

Yet another feature of the invention resides in providing a cotter pin and pin retainer member which serves very effectively to hold the cotter pin in place, but in which the retainer member itself is locked or spread relative to the cotter hole and thereby serves the same purpose as a cotter pin should the latter ever inadvertently drop out.

Other objects and features will hereinafter appear.

In the drawings:

Figure 1 is a side view, partially in section, showing the cotter pin retainer in association with a body, the cotter pin not being fully inserted.

Fig. 2 is a sectional view taken on the line 2—2 in Fig. 1.

Fig. 3 is a view similar to Fig. 1, but taken at a right angle thereto.

Fig. 4 is a sectional view taken on the line 4—4 in Figs. 1 and 3.

Fig. 5 is a view similar to Fig. 3, but showing the cotter pin fully inserted in the body.

Fig. 6 is a detail view showing a modified form of retainer member.

Fig. 7 is a detail view similar to Fig. 6, but showing another modified form of retainer member.

Fig. 8 is a side view, partially in section, showing a cotter pin retainer embodying the modified retainer member of Fig. 7, completely inserted in a body.

Fig. 9 is a sectional view taken on the line 9—9 in Fig. 7.

Fig. 10 is a view similar to Fig. 3, but showing a modified form of the invention.

Fig. 11 is a sectional view taken on the line 11—11 in Fig. 10.

Fig. 12 is a view similar to Fig. 10, but showing the cotter pin fully inserted in the body.

Fig. 13 is a sectional view taken on the line 13—13 in Fig. 12.

Fig. 14 is a detail view showing the modified retainer member disclosed in Figs. 10, 11, 12 and 13.

Fig. 15 is a detail view showing another modified retainer member fully inserted in a body.

Fig. 16 is a detail view of another modified form of retainer member.

Fig. 17 is a view similar to Fig. 3 but showing a modified form of retainer.

Fig. 18 is a view similar to Fig. 17 but showing the cotter pin in a fully inserted position.

Fig. 19 is a sectional view taken on the line 19—19 in Fig. 18.

Fig. 20 is an end view of the form of the invention shown in Figs. 17, 18 and 19.

Before describing the present improvements and mode of operation thereof in detail it should be understood that the invention is not limited to the details of construction and arrangement of parts shown in the accompanying drawings, which are merely illustrative of the present preferred embodiments, since the invention is capable of other embodiments, and the phraseology employed is for the purpose of description and not of limitation.

Referring more particularly to the drawings and first to Figs. 1, 2, 3, 4 and 5 for the present preferred embodiment of the invention there is disclosed, for the purpose of illustration, a portion of the shank 30 of a large stud or pin 31 commonly used in many places on railroad equipment and in which is formed a cotter pin hole 33.

Now of particular importance there is provided by the present invention a novel cotter pin retainer 32 adapted to be inserted in the hole 33 to hold the stud or pin 31 in place.

The cotter pin retainer 32 includes a cotter pin 34 having a looped head 35 defining a looped opening 36 and having a pair or set of arms 37 adapted to be inserted in the hole 33 in the held body or stud 31. Also constituting a part of the cotter pin retainer 32 is a retainer member 38 adapted to automatically spread the cotter pin when the latter is moved longitudinally relative thereto. According to the present invention, however, the retainer member 38 is not only provided with a means for spreading the arms 37 of the cotter pin but is also provided with a means for locking the retainer member 38 relative to the stud 31 or other body in which the member 38 is inserted.

This retainer member 38 which may be thus locked relative to a stud when inserted in a hole therein, and which serves to spread the cotter pin to lock the same in place includes a central section 39, preferably flat as shown, and adapted to be positioned between the arms 37 of the cotter pin. If desired, guide fins 40 extending from the sides of the central section 39 and disposed to slightly overlie the arms 37 may be provided to centralize the retainer member 32 relative thereto and to aid in maintaining the cotter pin 34 and retainer member 38 in proper association.

For spreading the cotter pin arms 37 the retainer member 38 is provided at one end with a wedge shaped section 41 with the angularly disposed sides 42 thereof disposed so as to engage the cotter pin arms 37. As shown, this spreading section may advantageously be formed integral with the central section 39 as by twisting the spreading end of the retainer member 38. A flange 43 extending laterally from one of the angularly disposed sides 42 may be advantageously provided to aid in guiding the arms 37 relative to the spreading section.

Of importance, a resilient locking section or finger 44 is also provided on the spreading end of the retainer member 38. Preferably and as shown, this locking finger 44 is formed integral with the retainer member by bending a section thereof to extend in the direction of the cotter pin head when the pin 34 and retainer member 38 are in assembled relation.

The locking finger 44, it is to be noted, is so formed that the locking end 45 thereof is normally disposed outwardly an extent greater than that of the diameter of the cotter pin 34 or hole 33 in the stud. With this construction, while the locking finger 44 is initially pressed inwardly when the retainer member 38 is inserted in the hole 33 in a stud 31 or the like, when the member is fully inserted with the spreading section 41 extending from the stud, the locking finger 44 being freed from the hole 33 automatically springs outwardly, see Fig. 1, to prevent an inadvertent withdrawal of the retainer member.

For arresting further inward longitudinal movement of the retainer member 38 beyond a predetermined position with the spreading section 41 and locking finger 44 clear of the stud 30, there are provided at the end of the retainer member 38 opposite the spreading section 41, a pair of laterally extending fingers 46 formed to respectively overlie the arms 37 and adapted to engage the side of the stud shank 30.

It is to be noted that the fingers 46 are extended about the respective arms 37 a sufficient distance so that portions thereof are in line with the sides of the looped head 35 of the cotter pin. The fingers 46, therefore, are adapted to engage the head 35 free of the looped opening therein. Shoulders 47 may, as shown, be advantageously formed on the exterior of the looped head 35 to engage with the laterally extending fingers 46 to thus serve most effectively to arrest the longitudinal movement of the cotter pin after the arms 37 thereof have been properly spread.

Preferably these laterally extending fingers are so formed that they frictionally engage the cotter pin arms 37 and thus serve to supplement the spreading section 41 in locking the cotter pin in position. Additionally, the fingers 46 through their frictional gripping of the cotter pin arms 37 provide an effective means for preventing a falling out or loss of the cotter pin should the latter work loose from the spread position, shown in Fig. 5, to the nonspread position, shown in Fig. 3.

In the operation of the retainer, the retainer member 38 is first inserted between the arms 37 of the cotter pin, with the cotter pin spreading section 41 projecting beyond the cotter pin arms 37 as shown in Fig. 1. The assembled retainer 32 is then inserted in a hole 33 in a stud 31 or other body to be held in place. The locking finger 44 being freed from the hole 33 then automatically snaps outwardly to lock the retainer member relative to the stud. It is then merely necessary to strike the head 35 of the cotter pin with a suitable implement and the cotter pin 34 is moved longitudinally relative to the retainer member 38 which is held from movement by the laterally extending fingers 46. This relative movement causes the arms 37 to engage the angularly disposed sides 42 of the section 41 and be spread outwardly to thus effectively lock the cotter pin in position. To facilitate this spreading action the ends of the cotter pin arms 37 are preferably formed with inner bevelled faces 48 adapted to locate the wedge shaped section 41.

It is thus seen that with the cotter pin retainer 32 provided by the present invention, not only is the cotter pin automatically spread by the retainer member to be thus locked in place, but also that the retainer member 30 itself is locked to the stud by the locking finger 44. Hence, should the cotter pin work loose entirely and drop from the stud 31 the retainer member 30 alone, by the fingers 46 and 46 is locked to the stud 31 and serves like a cotter pin to hold the stud in place. However, the retainer member, of this form as well as other forms of the invention, may be removed by closing the finger such as 44 with pliers or the like.

If desired a slightly modified retainer member 49, as shown in Figs. 10, 11, 12, 13 and 14, may be utilized to produce a cotter pin retainer 50 that functions in the same manner as the cotter pin retainer 32 first described.

The cotter pin 34 in this modified retainer is shown as of exactly the same construction as the cotter pin in Fig. 1. The retainer member 49, however, instead of being formed as a one-piece member is made with a separate spring locking finger 52 suitably secured thereto, as by welding.

The retainer member 49 includes a central section 53 having laterally extending guide fins 54 disposed to slightly overlie the arms 37 to thus centralize the retainer member relative thereto. Likewise, the retainer member 49 is provided at one end thereof with laterally projecting fingers 55, adapted, as the fingers 46, to frictionally grip the arms 37, to engage the looped head 35 of the cotter pin 50 and to engage the side of the stud. In addition there may be included a longitudinal extension 56 on the retainer member to engage the cotter pin head 35 within the looped opening 36 therein. Such an extension, however, serves to congest the opening 36 in the cotter pin head 35 and thus makes it difficult to apply the usual cotter pin removing hook therein. Also, there is formed at the other end of the retainer member 49 a wedging section 57 having angularly disposed sides 58 for engaging and spreading the cotter pin arms.

The resilient locking finger 52 is set in a suitable groove 59 provided by a hook portion 60 on the spreading end of the retainer member, and normally projects outwardly an extent greater than the diameter of the hole 33 and cotter pin 34. Like the locking finger 44 in Fig. 1, it is adapted to be pressed inwardly when passing through the cotter pin hole 33 in the stud 30 and to automatically spring outwardly to lock the retainer member relative to the stud when fully inserted therein.

The operation of the modified cotter pin retainer 49 is exactly the same as that of the one first described and the same advantages follow from its use.

In Fig. 15 a retainer member 61 is shown differing from the one illustrated in Figs. 9 through 14 in the provision of two locking fingers 62 set and welded in suitable grooves 63 provided by hook portions 64 at either side of the spreading end of the retainer member. This retainer member 61 thus provides a somewhat stronger lock than the form first described. Its operation is in all other particulars exactly the same as the other forms heretofore described, it being provided with laterally projecting fingers 65 at one end, guide fins 66 and a wedge shaped spreading section 67. It is to be noted that spreading section 67 is narrower than the central section 68 and positioned centrally thereof so that the spring locking fingers 62 may be pressed inwardly to pass through the cotter pin hole when the member is inserted in the stud.

In Fig. 16, the retainer member 69 is similar to the one shown in Fig. 15 in that it includes central section 70, laterally projecting fingers 71, a centrally disposed spreading section 72 and a pair of hook portions 73 defining grooves 74 to receive the ends of a pair of spring locking fingers 75. It is to be noted, however, that notches 76 are formed in the lower end of the central section and facing the grooves 74 to receive inwardly offset tips 77 on the free ends of the spring locking fingers 71 to thus limit the outward movement thereof.

In Fig. 6, there is shown a retainer member 78 which like the retainer member disclosed in Fig. 1, is of a one-piece construction. In it, however, the spreading section and locking finger means are not formed by longitudinally twisting the retainer member and by bending one end of the retainer member upon itself. In it, the wedge shaped spreading section 79 is formed as an enlarged untwisted portion having angularly disposed opposite sides 80 adapted to engage the arms 37 of the cotter pin. The locking means is provided by preferably two fingers 81 which may be lanced out of the spreading section 79 so as to normally project outwardly a greater extent than the diameter of the cotter pin hole in the stud. Due to the natural resiliency of the metal, the lanced locking fingers 81 while pressed inwardly during their passage through the cotter pin hole 33 will move outwardly to lock the member relative to the body when the fingers are free of the hole.

Like the other forms of retainer members, the retainer member 78 of Fig. 6 may be advantageously provided with guide fins 82 to centralize the member relative to the cotter pin. Also, laterally projecting fingers 83 are formed at one end of the retainer member to grip the cotter pin arms 37, to engage the cotter pin head 35 and to engage the side of the stud 31.

Instead of providing a retainer member having spring fingers which move outwardly independently of the cotter pin arms 37 to lock the retainer member relative to the stud 31 as in all of the forms heretofore described, there may be utilized, as shown in Figs. 7, 8 and 9, a modified cotter pin retainer 84 having a modified retainer member 85 provided with locking fingers 86 movable outwardly to a locking position by the arms 37 of the cotter pin 34 which is of the same construction as the cotter pin illustrated in Fig. 1.

The retainer member 85 of this modified cotter pin retainer 84 is most like the retainer member 78 shown in Fig. 6. It includes a preferably flat central section 87 adapted to be inserted between the arms 37 of the cotter pin, having laterally extending guide fins 88 formed thereon adapted to centralize the retainer member relative to the arms 37 of the cotter pin. Like the retainer member 78, shown in Fig. 6, the retainer member 85 has provided at one end thereof laterally projecting fingers 89 adapted to grip the cotter pin arms 37, to engage the cotter pin head 35, and to engage the side of the stud 31.

Also, as in the form disclosed in Fig. 6, an enlarged portion is formed at the other end thereof to provide a wedge shaped spreading section 90. The locking fingers 86, however, instead of being lanced to normally extend outwardly from the retainer member are lanced so as to normally extend close to the retainer member. In order to insure the engagement of the cotter pin arms 37 with these locking fingers to force the same outwardly to a locking position when the cotter pin is moved longitudinally relative to the retainer member, raised bevels 91 are formed on the free ends of each of the locking fingers to extend laterally respectively thereto.

Thus, after the retainer member 85 has been initially inserted in the hole 33 in the stud, when the cotter pin is pushed longitudinally of the retainer member the cotter pin arms 37 engage the raised bevels 91 and force the locking fingers 86 outwardly to a locking position. Concurrently the wedged shaped section 90 of the retainer member spreads the arms 37 to thus firmly lock the cotter pin relative to the retainer member 85 and to the stud 31.

In Figs. 17, 18, 19 and 20 there is disclosed another modified cotter pin retainer 92, which like the cotter pin retainer shown in Figs. 7, 8 and 9, includes a retainer member 93 having locking fingers 94 which are normally maintained in an inoperative position, but which are moved to an operative position by arms 37 of the cotter pin 95. The cotter pin 95 used in this form of the invention is essentially the same as the cotter pin disclosed in Fig. 1. It differs from that cotter pin, however, in the provision of not only inner bevelled faces 48 but also outer bevelled faces 96 on the ends of the cotter pin arms.

The retainer member 93 used with the modified cotter pin retainer 92 shown in Figs. 17, 18, 19 and 20 like the retainer member 30 disclosed in Fig. 1, includes a preferably flat central section 97 of a width substantially the same width as and adapted to be positioned between the arms 37 of the cotter pin. Likewise at one end of the retainer member there are provided laterally projecting fingers 98 adapted to frictionally grip the cotter pin arms 37, to engage the cotter pin head 35 and to engage the side of the stud 31.

To provide a means for spreading the cotter pin arms 37 the retainer member 93 adjacent the other end thereof is bent or otherwise formed to provide a channel shaped spreading section 99 with the flanges 100 thereof of substantially wedge shape so that their free edges 101 are angularly disposed relative to the connecting portion 102. With this construction, when the cotter pin is moved longitudinally of the retainer member 93 the arms 37 thereof engage respectively the connecting portion 102 and the free edges 101 of the flanges 100 to thus be spread outwardly.

The locking fingers 94 which are moved outwardly to a locking position by the cotter pin arms 37 are of substantially the same configuration as the cotter pin head engaging fingers 98 and are formed on the central section 97 of the retainer member and located so as to be just free of the cotter pin hole 33 when the retainer member 93 is fully inserted in the stud as shown in Fig. 17.

The locking fingers 94, which extend laterally from the retainer member and are disposed so as to be adapted to overlie the respective cotter pin arms 37, are so formed that they normally do not project outwardly a sufficient extent to engage the side of the stud. However, after the cotter pin retainer 92, including both the cotter pin 95 and retainer member 93, has been initially inserted in the cotter pin hole so that the fingers 98 engage the side of the stud, when the cotter pin 95 is moved longitudinally of the retainer member 93 the outer bevels 96 on the ends of the arms 37 engage bevelled portions 103 on the inner faces of the locking fingers and force the latter outwardly to the operative locking position shown in Figs. 18, 19 and 20. Continued movement of the cotter pin causes the arms 37 to engage and be spread outwardly by the channel shaped spreading section 99.

With this latter form as in all the forms heretofore considered in detail, it is seen that a cotter pin retainer is provided which is not only simple in construction and operation but which when completely inserted in the stud is most effectively and automatically locked in place.

Variations and modifications may be made within the scope of this invention and portions of the improvements may be used without others.

Having thus described the invention, what is claimed as new is:

1. A cotter pin retainer comprising a cotter pin having a set of arms insertable in a hole in a body; a retainer member; spreading means on said member; and means for locking said retainer member in the body.

2. A cotter pin retainer comprising a cotter pin having a head and a set of arms insertable in a hole in a body; a retainer member; spreading means on said member; means on said retainer member for engaging said head; and means for locking said retainer member in the body.

3. A cotter pin retainer comprising a cotter pin having a looped head defining an opening, and a set of arms insertable in a hole in a body; a retainer member between said arms; means on said retainer member for engaging said head and free of said opening therein; spreading means on said retainer member; and means for locking said retainer member in said body.

4. A cotter pin retainer comprising a cotter pin having a set of arms insertable in a hole in a body; a retainer member; means for guiding and centering said member between said arms; spreading means on said member; and means for locking said retainer member in the body.

5. A cotter pin retainer comprising a cotter pin having a set of arms insertable in a hole in a body; a retainer member; spreading means on said member; means for locking said retainer member in the body; and means on said retainer member movable to lock the same relative to said body after insertion of the member therein.

6. A cotter pin retainer comprising a cotter pin having a set of arms insertable in a hole in a body; a retainer member; means on said member for spreading said arms when the latter are moved relative thereto; and resilient means on said retainer member movable to lock the said member relative to said body when the member is inserted therein.

7. A cotter pin retainer comprising a cotter pin having a set of arms insertable in a hole in a body; a retainer member; means on said member for spreading said arms when the latter are moved relative thereto; and means movable by said arms to lock said retainer member relative to said body.

8. A cotter pin retainer comprising a cotter pin having a set of arms insertable in a hole in a body; a retainer member between said arms; means on said member for arresting movement of the latter in a predetermined position when inserted in said body; means on said member for spreading said arms when the latter are moved relative thereto; and means on said retainer member movable to lock the same relative to said body after the insertion of the member therein.

9. A cotter pin retainer comprising a cotter pin having a set of arms insertable in a hole in a body; a retainer member between said arms; means on said member for arresting movement of the latter in a predetermined position when inserted in said body; means on said member for spreading said arms when the latter are moved relative thereto; and resilient means on said retainer member movable to lock said member relative to said body when inserted therein.

10. A cotter pin retainer comprising a cotter pin having a set of arms insertable in a hole in a body; a retainer member between said arms; means on said member for arresting movement of the latter in a predetermined position when inserted in said body; means on said member for spreading said arms when the latter are moved relative thereto; and means movable by said arms to lock said retainer member relative to said body.

11. A cotter pin retainer comprising a cotter pin having a head and a set of arms insertable in a hole in a body; a retainer member between said arms; a finger on said member for engaging said head and for arresting movement of said member in a predetermined position relative to said body when inserted therein; means on said retainer member for spreading said arms when moved relative thereto; and means on said retainer member movable to lock the same in said body after insertion of the member therein.

12. A cotter pin retainer comprising a cotter pin having a set of arms insertable in a hole in a body; a retainer member between said arms; guide means on said member for locating and centering the latter relative to said arms; means on said member for arresting movement of the latter when inserted in said hole in the body; and means on said member movable to lock the same relative to said body after insertion of the member therein.

13. A cotter pin retainer comprising a cotter pin having a head with shoulders on the underside thereof, and having a set of arms insertable in a hole in a body; a retainer member between said arms; means on said retainer member for spreading said arms when the latter are moved relative thereto; means on said retainer member for engaging said shoulders; and means for locking said retainer member in the body.

14. A cotter pin retainer comprising a cotter pin having a set of arms insertable in a hole in a body; a retainer member between said arms; laterally projecting means on said member for engaging said body to arrest movement of the member relative thereto; means on said member for spreading said arms when the latter are moved relative to said member and said body; and means on said member movable laterally after being inserted in said body to lock said member relative thereto.

15. A cotter pin retainer comprising a cotter pin having a head, and having a set of arms insertable in a hole in a body; a retainer member between said arms; means on said member for arresting longitudinal movement thereof relative to said body; means on said member for spreading said arms when the latter are moved longitudinally relative to said member and said body; a locking finger on said member; and means on said finger engageable by said arms to move said finger outwardly to lock said member relative to said body.

16. A cotter pin retainer comprising a cotter pin having a head, and having a set of arms insertable in a hole in a body; a retainer member between said arms; means on said member for arresting longitudinal movement thereof relative to said body; means on said member for spreading said arms when the latter are moved longitudinally relative to said member and said body; and a pair of locking fingers on said member, movable outwardly by said arms to lock said member relative to said body.

17. A cotter pin retainer comprising a cotter pin having a head, and having a set of arms insertable in a hole in a body; a retainer member between said arms; means on said member for arresting longitudinal movement thereof relative to said body; means on said member for spreading said arms; and an integral finger on said member movable outwardly by said arms to lock said member relative to said body.

18. A cotter pin retainer comprising a cotter pin having a head, and having a set of arms insertable in a hole in a body; a retainer member between said arms; means for centralizing said member relative to said arms; a finger on said member, engageable with said body to arrest movement of said member relative thereto; spreading means on said retainer member; a locking finger section on said retainer member; and raised bevels on said locking finger engageable by said arms to move said finger outwardly to lock said member relative to said body.

19. A cotter pin retainer comprising a cotter pin having a set of arms insertable in a hole in a body; a retainer member between said arms; means for arresting longitudinal movement of said member relative to said body in one direction; a beveled end on said member for spreading said arms when the latter are moved longitudinally relative to said member and said body; and a spring finger on said end of the member, movable outwardly to lock the member relative to said body.

20. A cotter pin retainer comprising a cotter pin having a head and having a set of arms insertable in a hole in a body; a retainer member between said arms; means on said member for frictionally gripping said cotter pin and for arresting longitudinal movement of said member in said body; means on said member for spreading said arms; and means for locking said member relative to said body.

GEORGE T. COOKE.